May 11, 1937. A. H. SCHUMACHER 2,080,341
GRASS GUARD FOR SPRINKLER HEADS
Filed Sept. 24, 1935
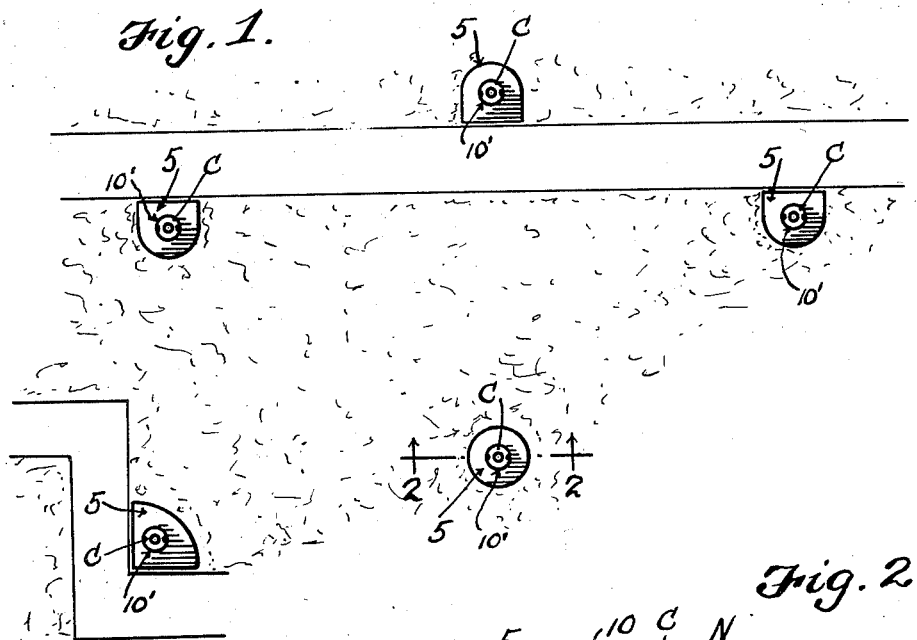
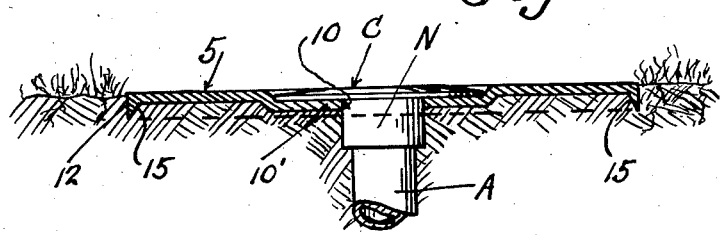
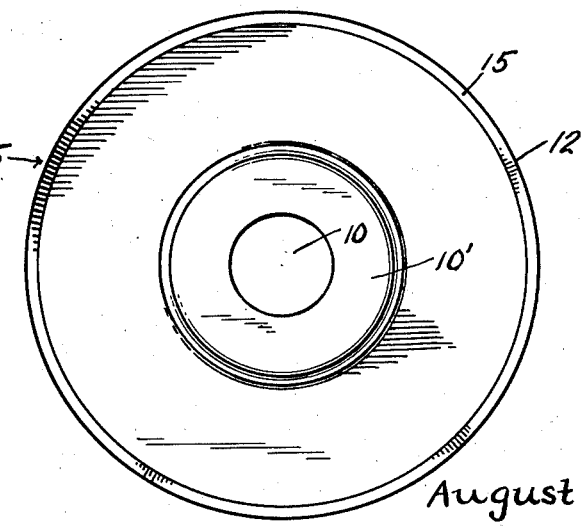
Inventor
August H. Schumacher
By L. B. James
Attorney Patented May 11, 1937

2,080,341

UNITED STATES PATENT OFFICE 2,080,341

GRASS GUARD FOR SPRINKLER HEADS

August H. Schumacher, Pomona, Calif.

Application September 24, 1935, Serial No. 41,926

2 Claims. (Cl. 299—60)

This invention relates to lawn sprinkling systems of the embedded type and more particularly to grass guards for the sprinkler heads thereof.

The primary object of this invention resides in the provision of a guard to be associated with each of the sprinkler heads of embedded lawn sprinkling systems to prevent grass growing in close proximity to the sprinkler head where it usually interferes with the operation of the same.

Another object of this invention resides in the provision of a grass guard for the sprinkler heads of embedded lawn sprinkling systems which can be readily secured beneath and around the sprinkler head.

A further object of this invention resides in the provision of a grass guard for each sprinkler head of an embedded lawn sprinkling system which can be inverted when installed to form a water basin to supply birds or other garden pets with drinking water.

A still further object of this invention resides in the provision of an article of manufacture in the form of a grass guard for the sprinkler heads of embedded lawn sprinkling systems which is simple in construction and easily installed.

With these and other objects in view this invention resides in certain novel features of construction to be hereinafter fully set forth in the specification, illustrated in the accompanying drawing and pointed out in the appended claims and, while the disclosure depicts my present conception of the invention, the right is reserved to resort to such changes in construction as come within the scope of the claims.

In the accompanying drawing forming a part of this application:

Fig. 1 is a plan view of a portion of a lawn showing the approximate arrangement of the grass guards relative to walks extending through the lawn.

Fig. 2 is an enlarged sectional view approximately on line 2—2 of Fig. 1.

Fig. 3 is an enlarged inverted plan view of the center grass guard.

Fig. 4 is a side view partly in section showing an embedded lawn sprinkler head having an integral grass guard.

In the present embodiment of this invention the numeral 5 designates, in general, a grass guard constructed in accordance with this invention and is preferably formed from a piece of metal or other suitable material into various sizes and configurations for disposition in different localities about a lawn.

While the aforesaid grass guards may be formed in various shapes and sizes, each type is provided with an aperture 10 and a rim 12 which is preferably beveled at 15, said rim is adapted to be embedded in the ground to sever the roots of the grass adjacent thereto and thereby check spreading of the same beneath the guard. To facilitate disposing the sprinkler head on a plane with the upper surface of the grass guard a depression 10' is provided around the aperture 10 as shown in Figs. 2 and 3.

Although the aforesaid rim is primarily provided for the above referred to function, the grass guard may be associated with the sprinkler head in inverted position, that is with the rim extending upwardly, whereupon water from the sprinkler head will be caught and held for birds and other garden pets, it being understood that drainage through the aperture 10 will be reduced by dirt compacting therein.

For the purpose of illustrating the manner of utilizing a grass guard of this character it will be noted upon references to Fig. 2, that a conduit A of an embedded sprinkling system is provided with the usual type of sprinkler head C having a nipple N which is extended through the aperture 10 and screwed on the conduit A to hold the grass guard against the ground.

With this invention fully set forth it is manifest that a grass guard is provided, for the sprinkler heads of embedded sprinkling systems, to prevent grass interferring with the operation of the sprinkler head and, through the simplicity of construction, it can be manufactured cheaply and sold at a nominal cost.

Having thus described my invention what I claim and desire to protect by Letters Patent is:

1. In a lawn sprinkler of the ground embedded type having a nozzle, said nozzle being provided with an outwardly extending flange adjacent the ground level, the combination with said nozzle of a grass guard consisting of a flat disk provided with an opening receiving said nozzle, said flange on said nozzle overlying said disk and being constructed and arranged to removably hold said disk against the surface of the ground, said disk being provided with a depending flange extending about the peripherial edge of the disk and adapted to be embedded in the ground and act as a barrier for grass roots.

2. In a lawn sprinkler of the ground embedded type having a nozzle, said nozzle being provided with an outwardly extending flange adjacent the ground level, the combination with said nozzle of a grass guard consisting of a flat disk provided with an opening receiving said nozzle, said flange on said nozzle overlying said disk and being constructed and arranged to removably hold said disk against the surface of the ground, said disk being provided with flanges extending about the inner and outer marginal edges of the disk and serving as rims for the disk when the disk is applied to a sprinkler nozzle with the flanges projecting upwardly whereby the disk serves as a grass guard for the sprinkler nozzle and as a drinking pan for pets.

AUGUST H. SCHUMACHER.